United States Patent
Coran et al.

(10) Patent No.: US 6,437,030 B1
(45) Date of Patent: Aug. 20, 2002

(54) THERMOPLASTIC VULCANIZATES AND PROCESS FOR MAKING THE SAME

(75) Inventors: Aubert Coran; Sabet Abdou-Sabet, both of Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/577,764

(22) Filed: May 24, 2000

(51) Int. Cl.$^7$ .......................... C08J 3/24; C08K 13/02; C08L 21/00
(52) U.S. Cl. ...................... 524/101; 524/106; 524/291; 524/342; 524/400; 524/432; 525/133; 525/134; 525/139; 525/141; 525/456
(58) Field of Search ................... 525/133, 134, 525/139, 141, 456; 524/101, 106, 291, 342, 400, 432

(56) References Cited

U.S. PATENT DOCUMENTS

| | | | |
|---|---|---|---|
| 2,440,909 A | 5/1948 | NIederl | 260/619 |
| 2,972,600 A | 2/1961 | Braidwood | 260/59 |
| 3,093,613 A | 6/1963 | Fusco et al. | 260/38 |
| 3,287,440 A | 11/1966 | Giller | 260/846 |
| 3,709,848 A | 1/1973 | Gerstin et al. | 260/19 |
| 3,887,756 A | 6/1975 | Gerstin et al. | 428/425 |
| 4,130,535 A | 12/1978 | Coran et al. | 260/33.6 |
| 4,271,049 A * | 6/1981 | Coran | 525/191 |
| 4,311,628 A | 1/1982 | Abdou-Sabet et al. | 260/33.6 |
| 5,093,426 A * | 3/1992 | Sakabe | 525/223 |
| 5,196,462 A | 3/1993 | Berta | 524/94 |
| 5,621,045 A | 4/1997 | Patel et al. | 525/237 |
| 5,936,038 A | 8/1999 | Coran et al. | 525/142 |

OTHER PUBLICATIONS

"Drying of Advanced Elastomer Systems, L.P. Engineered Thermoplastic Elastomers" Advanced Elastomer Systems Technical Correspondence, Apr. 23, 1991.

"New, Non–Hygroscopic, UV–Resistant Thermoplastic Vulcanizates for Extrusion" by Medsker et al., presented at a meeting of the Rubber Division, American Chemical Society, Oct. 8–11, 1996.

* cited by examiner

Primary Examiner—Patricia A. Short
(74) Attorney, Agent, or Firm—Arthur M. Reginelli

(57) ABSTRACT

A process for forming a thermoplastic vulcanizate compromising the steps of dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate. Also, a thermoplastic vulcanizate having low moisture pick-up with a technologically useful cure.

26 Claims, No Drawings

THERMOPLASTIC VULCANIZATES AND PROCESS FOR MAKING THE SAME

TECHNICAL FIELD

The present invention is generally directed toward thermoplastic vulcanizates and processes for making the same. More particularly, the thermoplastic vulcanizates of this invention include a rubber and a thermoplastic polymer. The rubber is advantageously cured by using a phenolic resin curative in the presence of a catalyst system formed by combining a metal halide and a metal carboxylate.

BACKGROUND OF THE INVENTION

Phenolic resins, which are also referred to as resole resins, are known crosslinking agents for unsaturated elastomers. For example, halogenated phenolic resins have been employed to crosslink butyl rubber as described in U.S. Pat. No. 2,972,600. This crosslinking reaction is typically carried out in the presence of a catalyst, such as zinc oxide, as set forth in U.S. Pat. No. 3,093,613. Where unhalogenated phenolic resins are employed, the crosslinking reaction may occur in the presence of a halogenated elastomer as taught by U.S. Pat. No. 3,887,756. Alternatively, unhalogenated phenolic resins may be used in the presence of a metal halide as a catalyst. The use of metal halides, however, has presented solubility and corrosion problems. One solution to this problem, which is taught by U.S. Pat. No. 3,287,440, is to form the metal halide in situ by reacting a halogen donor and a metal compound that is capable of reacting with the halogen donor at elevated temperatures.

Phenolic resins have also been employed to cure the rubber component of thermoplastic vulcanizates as set forth in U.S. Pat. No. 4,311,628. Thermoplastic vulcanizates are technologically useful compositions of matter that often include small, finely-divided particles of rubber that are well dispersed within a thermoplastic matrix. These compositions are very useful because they have many of the properties of an elastomer and are processable as thermoplastics. Typically, these compositions are formed by dynamic vulcanization whereby the elastomer is crosslinked within a blend that includes the elastomer and a thermoplastic polymer while both polymers are undergoing molten-state mixing or masticating.

Generally, the rubber of useful thermoplastic vulcanizates is cured to an extent that only less than about 15 percent of the rubber is extractable. To achieve this extent of cure when a phenolic resin is employed as the curative, it is known that the vulcanizable composition must contain at least about eight milliequivalents of halide per 100 grams of rubber. The source of halide can be from the phenolic resin, the rubber, or the addition of a halogen donor such as a metal halide. Below this amount of halide, however, the rate of cure decreases by about ten-fold and the elastomeric properties of the vulcanizate diminish as evidenced by a higher oil swell, an increased compression set, and an increased modulus.

The problem, however, is that the thermoplastic vulcanizates that are cured in the presence of at least about eight or more milliequivalents of halide per 100 grams of rubber attract and absorb atmospheric moisture. This moisture may impact processing, physical properties, end-product performance, and surface appearance. As a result, moisture pick-up control is very important for successful processing. In fact, effectively controlling the moisture is necessary to attain good surface finishes and high quality finished parts. Therefore, these thermoplastic vulcanizates must be dried prior to processing.

Accordingly, while the use of phenolic resin curatives provides useful thermoplastic vulcanizates that have many desirable properties, there is a need to improve the hygroscopic properties of these thermoplastic vulcanizates.

SUMMARY OF INVENTION

In general the present invention provides a process for forming a thermoplastic vulcanizate comprising the steps of dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate.

The present invention also includes a thermoplastic vulcanizate formed by a process comprising the steps of dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate.

Still further, the present invention provides a thermoplastic vulcanizate comprising cured rubber blended with a thermoplastic polymer, where said cured rubber is formed by dynamically curing a rubber by using a phenolic resin curative in the presence of a catalyst system formed by combining a metal halide and a metal carboxylate, where the thermoplastic vulcanizate contains less than seven milliequivalents of halide per 100 grams of rubber, and where said rubber is cured to an extent that less than 15 weight percent of the rubber is extractable from the thermoplastic vulcanizate.

Advantageously, the use of the curative system of the present invention provides useful thermoplastic vulcanizates that are less hygroscopic than Ethermoplastic vulcanizates that are prepared with conventional phenolic resin curing systems. It has been found that the cure system employed in this invention allows for reduced halide and therefore reduces the hygroscopicity of the resulting thermoplastic vulcanizates without an appreciable compromise to the properties of the thermoplastic vulcanizate. Furthermore, the reduction in the amount of halide employed advantageously reduces mold fouling and corrosion.

PREFERRED EMBODIMENT FOR CARRYING OUT THE INVENTION

This invention is directed toward thermoplastic vulcanizates and processes for making the same. The thermoplastic vulcanizates of this invention include a cured rubber and thermoplastic polymer where the rubber is cured by using a phenolic resin curative in the presence of a catalyst system that is formed by combining a metal halide and a metal carboxylate. These thermoplastic vulcanizates are preferably prepared by dynamically vulcanizing at least one phenolic resin-curable rubber within a blend that includes the rubber and at least one thermoplastic polymer. The thermoplastic vulcanizates of this invention may further include optional fillers, extender oils, antioxidants, and other additives that are commonly used in rubber compositions. In a preferred embodiment, the thermoplastic vulcanizates include a heat stabilizer.

The phenolic resin-curable rubber may include any rubber or mixture thereof that is capable of being crosslinked with a phenolic resin. Reference to a rubber may include mixtures of more than one rubber. Useful rubbers typically contain some degree of unsaturation in their polymeric main chain. Some non-limiting examples of these rubbers include elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrine terpolymer rubber, and polychloroprene. The preferred rubbers are elastomeric copolymers and butyl rubber.

As used within this specification, the term elastomeric copolymer refers to rubbery copolymers polymerized from ethylene, at least one α-olefin monomer, and at least one diene monomer. The α-olefins may include, but are not limited to, propylene, butene-1, hexene-1, 4-methyl-1 pentene, octene-1, decene-1, or combinations thereof. The preferred a-olefins are propylene, hexene-1, octene-1 or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used. The preferred elastomeric copolymers include terpolymers of ethylene, propylene, and 5-ethylidene-2-norbornene.

Elastomeric copolymers are commercially available under the tradename Vistalon™ 3666, 7500 and 8500 (ExxonMobil Chemical Co.; Houston, Tex.) or the tradename Keltan™ P597 (DSM Copolymers; Baton Rouge, La.). Vistalon™ 3666 and Keltan™ P597 do contain processing oils.

As used within this specification, the term butyl rubber means rubbery amorphous copolymers of isobutylene and isoprene or an amorphous terpolymer of isobutylene, isoprene, and a divinyl aromatic monomer. These copolymers and terpolymers should preferably contain from about 0.5 to about 10 percent by weight, or more preferably from about 1 to about 4 percent by weight, isoprene. The term butyl rubber also includes copolymers and terpolymers that are halogenated with from about 0.1 to about 10 weight percent, or preferably from about 0.5 to about 3.0 weight percent, chlorine or bromine. This chlorinated copolymer is commonly called chlorinated butyl rubber. Any butyl rubber is satisfactory for the practice of this invention, but halogen-free butyl rubber containing from about 0.6 to about 3.0 percent unsaturation is preferred, with butyl rubber having a polydispersity of about 2.5 or below being especially preferred. Butyl rubbers are commercially prepared by polymerization at low temperature in the presence of a Friedel-Crafts catalyst as disclosed within U.S. Pat. Nos. 2,356,128 and 2,944,576. Butyl rubber is commercially available from a number of sources as disclosed in the Rubber World Blue Book. For example, butyl rubber is available under the tradename Polysar Butyl™ (Bayer; Germany) or the tradename Exxon Butyl™ (Exxon Chemical Co.).

The thermoplastic polymer is a crystalline thermoplastic polymer or mixture thereof. Reference to a thermoplastic polymer may include mixtures of more than one thermoplastic polymer. Useful thermoplastic polymers are solid, generally high molecular weight, plastic materials. Preferably, these polymers are crystalline or semi-crystalline polymers, and more preferably have a crystallinity of at least 25 percent as measured by differential scanning calorimetry. Polymers with a high glass transition temperature are also acceptable as the crystalline thermoplastic polymers. The resin also preferably has a melt temperature or glass transition temperature in the range from about 80° C. to about 350° C., but the melt temperature should generally be lower than the decomposition temperature of the thermoplastic vulcanizate.

Exemplary crystalline thermoplastic polymers include crystallizable polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics. The preferred thermoplastic resins are crystallizable polyolefins that are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

An especially preferred thermoplastic polyolefin is high-crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 1.0 dg/min per ASTM D-1238.

Crystalline thermoplastic polymers can be purchased from a number of commercial sources. For example, it can be purchased under the tradename D008M™ (Aristec Chemical Corporation; Pittsburgh, Pa.).

Any phenolic resin, or mixture thereof, that is capable of crosslinking a rubber polymer can be employed in practicing the present invention. Reference to phenolic resin may include mixtures these resins. U.S. Pat. Nos. 2,972,600 and 3,287,440 are incorporated herein in this regard. These phenolic resins can be used to obtain the desired level of cure without the use of other curatives or curing agents.

The preferred phenolic resin curatives can be referred to as resole resins and are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. These phenolic curatives are typically heat reactive resins and may be referred to as phenolic resin curatives or simply phenolic resins for purposes of this specification.

Phenolic resins that are useful in the practice of the present invention may be obtained under the tradenames SP-1044, SP-1045, SP-1055, and SP-1056 (Schenectady International; Schenectady, N.Y.). It should be appreciated that the SP-1044 and SP-1045 products are alkylphenol-formaldehyde resins, and that the SP-1055 and SP-1056 products are bromomethylated alkylphenol-formaldehyde resins. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a preferred phenolic resin curative is defined according to the general formula

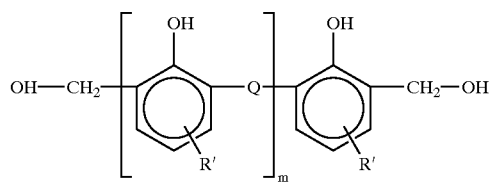

(I)

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms. The most preferred phenolic resins are also defined in U.S. Pat. No. 5,952,425, which is incorporated herein by reference.

The catalyst system that is employed in the present invention can be formed by combining at least one metal halide and at least one metal carboxylate. Reference to metal halides or metal carboxylates may include mixtures thereof. The preferred metal halides are zinc chloride and stannous chloride. The preferred metal carboxylates are zinc carboxylate and tin carboxylate. The ligand or acid residue of the metal carboxylate can include any acid residue that contains from about 1 to about 30 carbon atoms, and more preferably from about 6 to about 26 carbon atoms. These residues can derive from, but are not limited to, formic acid, acetic acid, lauric acid, stearic acid, benzoic acid, chromic acid, lactic acid, silicic acid, carbonic acid, hexanoic acid, naphthenic acid, neodecanoic acid, arachidic acid, and cerotic acid. Some specific examples of zinc carboxylates include zinc stearate, zinc benzoate, zinc laurate, zinc hexanoate, zinc naphthenate, zinc neodecanoate, zinc chromate, zinc silicate, zinc carbonate, or a combinations thereof. Some specific examples of stannous carboxylates include stannous stearate, stannous benzoate, stannous laurate, stannous chromate, stannous silicate, stannous carbonate, or a combination thereof. The preferred carboxylates include those containing residues from lauric acid and stearic acid.

The metal halides and metal carboxylates that are useful for practicing the present invention are conventional compounds that are commercially available from a number of commercial sources. Also, those skilled in the art will be able to prepare compounds such as metal carboxylates without undue experimentation. For example, zinc stearate can simply be made by reacting zinc oxide with stearic acid.

Although a complex is believed to result from the combination of the metal halide and metal carboxylate, the degree of interaction or reaction between the metal halide and metal carboxylate is not known with any great degree of certainty. Therefore, the term catalyst system has been employed to encompass a simple mixture of the metal halide and metal carboxylate, a complex of the metal halide and metal carboxylate that is formed by physical or chemical forces of attraction, a reaction product of the metal halide and metal carboxylate, or a combination of the foregoing.

In a preferred embodiment of this invention, the thermoplastic vulcanizates include at least one stabilizing compound or antioxidant. The preferred stabilizer or antioxidant is an imidazole-type inhibitor. In the most preferred embodiments of this invention, these imidazole-type inhibitors are mercapto-metal salts such as, but not limited to, zinc 2-mercaptotoluimidazole, zinc 2-mercaptobenzimidazole, zinc 2-mercapto-4(5)-methylbenzimidazole. These salts are well known in the art and commercially available. For example, zinc 2-mercaptotoluimidazole is available under the tradename Vanox™ ZMTI (R. T. Vanderbilt; Norwalk, Conn.), zinc 2-mercaptobenzimidazole is available under the tradename Naugard™ ZMB (Uniroyal Chemical Co; Naugatuck, Conn.), and zinc 2-mercapto-4(5)-methylbenzimidazole is available under the tradename Vulkanox™ ZMB-2/C (Mobay Chemical; Pittsburgh, Pa.).

It has been found that these imidazole-type inhibitors show improved results when used in a synergistic combination with hindered-phenolic antioxidants. These antioxidants are likewise well known in the art and commercially available. For example, tetrakis[methylene(3,5-di-tert-butyl-4-hydroxyhydrocinnamate)] methane is available under the tradename Irganox™ 1010 (Ciba-Geigy Corp.; Tarrytown, N.Y.). Other examples include octadecyl 3,5-di-t-butyl-4,hydroxyhydrocinnamate, which is available under the tradename Irganox™ 1076 (Ciba-Geigy), the butylated reaction product of p-cresol and dicyclopentadiene, which is available under the tradename Wingstay™ L (Goodyear; Akron, Ohio.), 1,3,5-trimethyl-2,4,6-tris(3,5-di-t-butyl-4-hydroxybenzyl)-benzene, which is available under the tradename Ethanox™ 330 (Ethyl Corp.; Baton Rouge, La.), and 1,3,5-tris(3,5-di-t-butyl-4-hydroxybenzyl)isocyanurate, which is available under the tradename Agerite.™ GT (Vanderbilt).

It has still further been found that the use of calcium stearate in combination with the imidazole-type inhibitor and the hindered-phenolic antioxidant creates a stabilizer package that provides for a thermoplastic vulcanizate having outstanding heat stability. The combination of the calcium stearate, imidazole-type inhibitor, and hindered-phenolic antioxidant may be referred to as a stabilizer package. The calcium stearate, imidazole-type inhibitor, and hindered-phenolic antioxidant can be preblended to form a masterbatch before addition to the thermoplastic vulcanizate, or the ingredients can be separately added to the composition. Whether added individually or as a masterbatch, the stabilizer package is preferably added to the thermoplastic vulcanizate after vulcanization has been essentially completed, i.e., the curative has been essentially consumed.

Preferably, plasticizers, extender oils, synthetic processing oils, or a combination thereof are employed in the compositions of the present invention. The type of processing oil selected will typically be consistent with that ordinarily used in conjunction with the specific rubber or rubbers present in the composition. The extender oils may include, but are not limited to, aromatic, naphthenic, and paraffinic extender oils. The preferred synthetic processing oils are polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention dramatically lowers the Tg of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. It is important that the ester be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters.

In addition to the rubber, the crystalline thermoplastic polymer, and optional processing oils, and optional stabilizer package, the thermoplastic vulcanizates of this invention may include other additives such as, but not limited, fillers, pigments, and processing additives, adhesives, tackifiers, and waxes. For example, the properties of the thermoplastic vulcanizates of this invention may be modified, either before or after vulcanization, by the addition of ingredients that are conventional in the compounding of rubber, thermoplastics, and blends thereof. Non-limiting examples of fillers include both organic and inorganic fillers such as, carbon black, silica, titanium dioxide, clay, talc, fiber glass, and discontinuous fibers such as wood cellulose fibers. Some non-limiting examples of processing additives include stearic acid and lauric acid. The addition of carbon black, extender oil, or both, preferably prior to dynamic vulcanization, is particularly preferred. Carbon black improves the tensile strength, and an extender oil can improve processability, the resistance to oil swell, heat stability, hysteresis, cost, and permanent set.

In an especially preferred embodiment of the present invention, zinc oxide is added to the thermoplastic vulcanizate. It has been found that the addition of zinc oxide enhances the thermostability of the resulting thermoplastic vulcanizate, especially where a useful stabilizer package is employed. The zinc oxide may be added before the rubber is cured, after the rubber is cured, or both before and after the rubber is cured. It has also been found that the presence of zinc oxide enhances the fabricability of the thermoplastic vulcanizate.

The compositions of this invention will contain a sufficient amount of rubber to form a rubbery composition of matter. Preferably, the compositions should comprise at least about 25 parts by weight rubber, preferably at least about 35 parts by weight rubber, even more preferably at least about 45 parts by weight rubber, and still more preferably at least about 50 parts by weight rubber per 100 parts by weight of the rubber and thermoplastic polymer combined. More specifically, the amount of cured rubber within the thermoplastic vulcanizate is generally from about 25 to about 90 percent by weight, preferably from about 45 to about 85 percent by weight, and more preferably from about 60 to about 80 percent by weight of the total weight of the rubber and the thermoplastic polymer combined.

The amount of crystalline thermoplastic polymer within the thermoplastic vulcanizate of this invention is generally from about 10 to about 75 percent by weight, preferably from about 15 to about 55 percent by weight and more preferably from about 20 to about 40 percent by weight of the total weight of the rubber and the thermoplastic combined.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. In general, a vulcanizing amount of phenolic curative comprises from about 1 to about 20 parts by weight, more preferably from about 3 to about 16 parts by weight, and even more preferably from about 4 to about 12 parts by weight, phenolic resin per hundred parts by weight rubber (phr).

With respect to the catalyst system, the molar ratio of the metal halide to the metal carboxylate should be from about 1:10 to about 2:1, preferably from about 1:5 to about 2:1.5, more preferably from about 1:3 to about 2:1.3, and most preferably about 1:1. The amount of catalyst system employed in preparing the thermoplastic vulcanizates of the present invention is best explained with reference to amount of halide within the system. The term halide refers to halide ions, halide radicals, halide substituents, or any other halide radicals that may be present within the system. The amount of halide within the system should generally be less than about seven milliequivalents per 100 grams of rubber, preferably less than about six milliequivalents per 100 grams of rubber, more preferably less than about five milliequivalents per 100 grams of rubber, even more preferably less than about four milliequivalents per 100 grams of rubber, and still more preferably less than about three milliequivalents per 100 grams of rubber.

With respect to the stabilizers and stabilizer package, it is preferred to employ from about 1 to about 5 parts by weight imidazole-type inhibitor phr (per hundred parts by weight rubber). More preferably, from about 1.5 to about 4 parts by weight imidazole-type inhibitor phr is employed, and even more preferably from about 2 to about 3.5 parts by weight imidazole-type inhibitor phr is employed. The imidazole-type inhibitor is preferably used in combination with about 0.5 to about 4 parts by weight hindered-phenolic antioxidant phr, more preferably from about 0.8 to about 3 parts by weight hindered-phenolic antioxidant phr, and even more preferably form about 1 to about 2 parts by weight hindered-phenolic phr. In combination with the imidazole-type inhibitor and the hindered-phenolic antioxidant, it is especially preferred to employ from about 0.5 to about 4 parts by weight calcium stearate phr, more preferably from about 0.8 to about 3 parts by weight calcium stearate phr, and even more preferably from about 1 to about 2 parts by weight calcium stearate phr.

Zinc oxide should preferably be used in an amount from about 1 to about 8 parts by weight phr, more preferably from about 2 to about 6 parts by weight phr, and even more preferably from about 3 to about 4 parts by weight phr.

Generally, from about 5 to about 300 parts by weight extender oil per 100 parts rubber is added. Preferably, from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts per one hundred parts rubber, and preferably less than about 175 parts per one hundred parts rubber.

Filler may be added in amount from about 20 to about 250 parts by weight, and preferably from about 40 to about 100 parts by weight, per 100 parts by weight of rubber. The amount of carbon black that can be used depends, at least in part, upon the type of carbon black and the amount of extender oil that is used. The amount of extender oil depends, at least in part, upon the type of rubber. High viscosity rubbers are more highly oil extendable.

The thermoplastic vulcanizates of this invention are preferably prepared by using dynamic vulcanization techniques. Dynamic vulcanization is a process whereby at least one rubber is crosslinked within a blend that includes the rubber and at least one non-vulcanizing polymer, i.e., thermoplastic polymer, while both polymers are undergoing mixing or masticating at some elevated temperature; the mixing or masticating continues until a desired vulcanization is achieved.

More specifically, the thermoplastic resin, the uncured rubber, and the other ingredients such as filler, plasticizer, lubricant, stabilizer, and the like, in a mixer heated to above the melting temperature of the thermoplastic resin. The mixing equipment can include Banbury™ mixers, Brabender mixers and certain mixing extruders such as co-rotating, counter-rotating, and twin-screw extruders, as well as ko-kneaders. The optional fillers, plasticizers, additives and the like can be added at this stage or later. After sufficient molten-state mixing to form a well mixed blend, the phenolic resin curatives, are generally added. One can also add the vulcanizing agent in solution with a liquid, for example a rubber processing oil, that is compatible with the other components. Crosslinking of the rubber can occur in a few minutes or less depending on the mix temperature, shear rate, and activators present for the phenolic resin curative.

The addition of the catalyst system can occur before the addition of the phenolic resin curatives, during the addition of the phenolic resin curatives, or after the addition of the phenolic resin curatives. Inasmuch as the catalyst system of this invention is formed by combining a metal halide and a metal carboxylate, the catalyst system can be preformed prior to its addition to the mixing equipment or it can be formed in situ, i.e., when the metal halide and metal carboxylate are added separately to the mixing equipment. Where the catalyst system is prepared prior to its addition to the mixing equipment, it is preferred to combine the metal halide and metal carboxylate under heat. Preferably, this combination takes place at a temperature of from about 110° C. to about 200° C.

Suitable curing temperatures include from about 120° C. to about 250° C. for a crystalline polyethylene or 175° C. to about 250° C. for a crystalline polypropylene, and more preferred temperatures are from about 150° or 170° to about 200° or 225° C. Heating and masticating at vulcanization temperature are generally adequate to complete the vulcanization reaction in a few minutes or less, but if shorter vulcanization times are desired, higher temperatures may be used. To obtain thermoplastic vulcanizates, it is important that mixing continues without interruption until vulcanization occurs. If appreciable curing is allowed after mixing has stopped, an unprocessable thermoplastic vulcanizate may be obtained. The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. As noted above the stabilizer package is preferably added to the thermoplastic vulcanizate after vulcanization has been essentially completed, i.e., the curative has been essentially consumed.

After discharge from the mixer, the blend containing vulcanized rubber and the thermoplastic can be milled, chopped, extruded, pelletized, injection molded, or processed by any other desirable technique. It is usually desirable to allow the fillers and a portion of any plasticizer to distribute themselves in the rubber or crystalline polyolefin phase before the rubber phase or phases are crosslinked.

As noted above, the thermoplastic vulcanizates of this invention include a cured rubber and a thermoplastic polymer. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 μm, more preferably smaller than about 25 μm, even more preferably smaller than about 10 μm or less, and still more preferably smaller than about 5 μm.

The term vulcanized or cured rubber refers to a natural or synthetic rubber that has undergone at least a partial cure. The degree of cure can be measured by determining the amount of rubber that is extractable from the thermoplastic vulcanizate by using boiling xylene or cyclohexane as an extractant. This method is disclosed in U.S. Pat. No. 4,311,628. By using this method as a basis, the cured rubber of this invention will have a degree of cure where not more than 15 percent of the rubber is extractable, preferably not more than 10 percent of the rubber is extractable, and more preferably not more than 5 percent of the rubber is extractable. In an especially preferred embodiment, the elastomer is technologically fully vulcanized. The term fully vulcanized refers to a state of cure such that the crosslinked density is at least $7 \times 10^{-5}$ moles per ml of elastomer or that the elastomer is less than about three percent extractable by cyclohexane at 23° C.

The degree of cure can be determined by the cross-link density of the rubber. This, however, must be determined indirectly because the presence of the thermoplastic polymer interferes with the determination. Accordingly, the same rubber as present in the blend is treated under conditions with respect to time, temperature, and amount of curative that result in a fully cured product as demonstrated by its cross-link density. This cross-link density is then assigned to the blend similarly treated. In general, a cross-link density of about $7 \times 10^{-5}$ or more moles (number of cross-links divided by Avogadro's number) per milliliter of rubber is representative of the values reported for fully cured elastomeric copolymers. Accordingly, it is preferred that the compositions of this invention are vulcanized to an extent that corresponds to vulcanizing the same rubber as in the blend statically cured under pressure in a mold with such amounts of the same curative as in the blend and under such conditions of time and temperature to give a cross-link density greater than about $7 \times 10^{-5}$ moles per milliliter of rubber and preferably greater than about $1 \times 10^{-4}$ moles per milliliter of rubber.

Advantageously, the thermoplastic vulcanizates of this invention, which may also be referred to as thermoplastic elastomers, are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

As noted above, the thermoplastic vulcanizates also advantageously contain less than about seven milliequivalents of halide per 100 grams of rubber, preferably less than about six milliequivalents of halide per 100 grams of rubber, more preferably less than about five milliequivalents of halide per 100 grams of rubber, even more preferably less than about four milliequivalents of halide per 100 grams of rubber and still more preferably less than about three milliequivalents of halide per 100 grams of rubber. As a result, the thermoplastic vulcanizates of this invention have less moisture pick-up, which is measured as percent moisture weight gain after 21 days of storage at about 80°–82° relative humidity at room temperature, than phenolic-cured thermoplastic vulcanizates of the prior art. In fact, the thermoplastic vulcanizates of this invention will pick-up less than about 0.1 percent moisture after 21 days, preferably less than 0.08 percent moisture after 21 days, and more preferably less than about 0.06 percent moisture after 21 days.

The thermoplastic vulcanizates of this invention are useful for making a variety of articles such as weather seals, hoses, belts, gaskets, moldings, boots, elastic fibers and like articles. They are particularly useful for making articles by blow molding, extrusion, injection molding, thermoforming, elasto-welding and compression molding techniques. More specifically, the articles of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Several thermoplastic vulcanizates were prepared according to the following general procedure. A thermoplastic resin, rubber, extender oil, if used, catalyst, and additional ingredients, excluding the phenolic curative, were initially charged to a Brabender internal mixer. The ingredients were mixed at a temperature above the melting point of the thermoplastic resin. Following this initial mixing, the phenolic curative and catalyst system were added to the mixer. The catalyst system was prepared by combining a metal halide and a metal carboxylate with moderate mixing at a temperature of about 140° C. The metal halide and metal carboxylate were combined in a mole to mole ratio. The catalyst system was allowed to crystallize over night.

Once vulcanization was completed, the compositions were removed from the mixer, molded and tested for their physical properties in accordance with ASTM standards. Specifically, Shore A and D hardness were determined pursuant to ASTM D-2240-91 at 23° C. by using a durometer. Ultimate tensile strength, ultimate elongation, and 100 percent modulus were determined according to ASTM D-412-92 at 23° C. by using an Instron Testing Machine. Weight gain was determined according to ASTM D-471 after 24 hours at 125° C. Tension set was determined according to ASTM D-412. Compression Set and Recovery was determined according to ASTM D-3542 for those tests run at −29° C. Compression Set and Recovery were determined according to ASTM D-395-B for those tests run at 70° C. and 100° C. Compression set and compression recovery tests were run for 24 hours at temperatures below room temperature and for 22 hours at room temperature and above. Notched Izod was determined according to ASTM D-256 at −40° C. The extrusion surface rating was determined by using a stylus profilometer.

EXAMPLE I

In this first example, the following ingredients were used. The rubber that was employed was EPDM rubber that was purchased under the tradename Keltan P597 (DSM). This EPDM rubber composition contains about 100 parts by weight of a processing oil per one hundred parts by weight rubber. The thermoplastic polymer was purchased under the tradename D008M (Artistech). The filler that was employed was a clay that was purchased under the tradename Icecap K Clay™ (Burgess Clay; Atlanta, Ga.). The phenolic resin was an alkylphenol-formaldehyde resin that was purchased under the tradename SP1045™ (Schenectady International). With respect to the catalyst system, the convention employed in the following tables identifies the catalyst system by way of the metal of the metal halide, followed by the metal of the metal carboxylate if distinct from the metal halide, followed by the halide ion, followed by the acid residue of the metal carboxylate. Accordingly, a catalyst system formed by the combination of zinc chloride and zinc laurate is identified as "zinc chloride-laurate." And, the catalyst system formed by the combination of zinc chloride and stannous stearate is identified as "zinc/stannous chloride-stearate."

TABLE 1

| Ingredient | Sample |||||
|---|---|---|---|---|---|
| | Control | 1 | 2 | 3 | 4 |
| EPDM* | 200 | 200 | 200 | 200 | 200 |
| Thermoplastic Resin | 58.5 | 58.5 | 58.5 | 58.5 | 58.5 |
| Filler | 42 | 42 | 42 | 42 | 42 |
| $SnCl_2 \cdot 2H_2O$ | 2.0 | — | — | — | — |
| Zinc Oxide | 2.0 | — | — | — | — |
| Zinc chloride-stearate | — | 6.68 | 3.34 | 1.67 | — |
| Zinc chloride-acetate | — | — | — | — | 0.77 |
| Phenolic Resin | 5.9 | 5.9 | 5.9 | 5.9 | 5.9 |
| Milliequivalents of Chlorine phr | 17.7 | 17.4 | 8.7 | 4.3 | 4.8 |
| Shore A Hardness | 77 | 76 | 76 | 75 | 76 |
| Ultimate Tensile Strength (psi) | 1341 | 1229 | 1278 | 1375 | 1588 |
| Ultimate Elongation (%) | 343.5 | 312 | 302.5 | 337.3 | 411 |
| M 100 (psi) | 681.5 | 616.8 | 626.5 | 625.5 | 622.5 |
| Compression Set, 22 hours @ 100° C. (%) | 30.3 | 32.8 | 32.5 | 31.3 | 35.9 |
| Weight Gain, 72 hours @ 125° C. (%) | 75.8 | 84.5 | 82.7 | 80.3 | 76.1 |
| Tension Set (%) | 9.1 | 12.1 | 11.6 | 10.6 | 9.1 |

*Contains 100 phr oil.

EXAMPLE II

A second experiment was conducted with ingredients that were similar to Example I except that different metal carboxylates were used.

TABLE II

| Ingredient | Sample ||||||
|---|---|---|---|---|---|---|
| | 1 | 2 | 3 | 4 | 5 | 6 |
| EPDM* | 200 | 200 | 200 | 200 | 200 | 200 |
| Thermoplastic Resin | 58.5 | 58.5 | 58.5 | 58.5 | 58.5 | 58.5 |
| Filler | 42 | 42 | 42 | 42 | 42 | 42 |
| Zinc chloride-acetate | 1.03 | 0.51 | 0.26 | — | — | — |
| Zinc chloride-stearate | — | — | — | 2.06 | 1.03 | 0.51 |
| Zinc chloridie-undecylenate | — | — | — | — | — | — |
| Zinc chloride-hexanoate | — | — | — | — | — | — |
| Phenolic Resin | 5.9 | 5.9 | 5.9 | 5.9 | 5.9 | 5.9 |
| Milliequivalents of Chlorine phr | 6.44 | 3.22 | 1.61 | 5.37 | 2.69 | 1.34 |
| Shore A Hardness | 78 | 75 | 76 | 77 | 75 | 74 |
| Ultimate Tensile Strength (psi) | 1576.5 | 1670 | 1357.5 | 1479.3 | 1657.8 | 1565 |
| Ultimate Elongation | 382.5 | 398.5 | 355.5 | 355.8 | 374.8 | 436.3 |
| M 100 (psi) | 673.5 | 659.5 | 668.8 | 631.5 | 663 | 608 |
| Compression Set, 22 hrs. @ 100° C. (%) | 25.8 | 25.2 | 28.3 | 35.6 | 28.2 | 26.2 |
| Weight Gain, 72 hrs. @ 125° C. (%) | 76.1 | 76.5 | 86.3 | 81.3 | 78.5 | 85.3 |
| Tension Set (%) | 9.6 | 8 | 8 | 11.6 | 9.6 | 7 |

TABLE II-continued

| Ingredient | Sample 7 | 8 | 9 | 10 | 11 | 12 |
|---|---|---|---|---|---|---|
| EPDM | 200 | 200 | 200 | 200 | 200 | 200 |
| Thermoplastic Resin | 58.5 | 58.5 | 58.5 | 58.5 | 58.5 | 58.5 |
| Filler | 42 | 42 | 42 | 42 | 42 | 42 |
| Zinc chloride-acetate | — | — | — | — | — | — |
| Zinc chloride-stearate | — | — | — | — | — | — |
| Zinc chloride-undecylenate | 1.03 | 0.51 | 0.26 | — | — | — |
| Zinc chloride-hexanoate | — | — | — | 0.51 | 0.26 | 0.13 |
| Phenolic Resin | 5.9 | 5.9 | 5.9 | 5.9 | 5.9 | 5.9 |
| Milliequivalents of Chlorine phr | 3.58 | 1.79 | 0.89 | 2.34 | 1.17 | 0.59 |
| Shore A Hardness | 77 | 76 | 75 | 75 | 74 | 75 |
| Ultimate Tensile Strength (psi) | 1495.8 | 1476 | 1400.3 | 1571.5 | 1237.8 | 1340.5 |
| Ultimate Elongation (%) | 381 | 385 | 373.5 | 391.3 | 333 | 394.5 |
| M 100 (psi) | 648.5 | 678.8 | 689.8 | 626.8 | 656.3 | 706.3 |
| Compression Set, 22 hrs @ 100° C. (%) | 27.3 | 27 | 26.5 | 29.9 | 29.8 | 37.1 |
| Weight Gain, 72 hrs. @ 125° C. (%) | 81.7 | 81.8 | 103.2 | 81.1 | 96.6 | 132.9 |
| Tension Set (%) | 10.6 | 8 | 8.5 | 8 | 7.5 | 8.5 |

EXAMPLE III

A third experiment was conducted with ingredients that were similar to Examples I & II. In addition to the testing described above, the samples of this experiment were also subjected to heat aging for one week at 150° C. and then analyzed for hardness, tensile strength, elongation, and modulus as described above. Furthermore, the samples of this experiment were subjected to testing to determine moisture pick-up by subjecting the samples to an environment having 81% humidity at 23° C.

TABLE III

| Ingredient | Sample 1 | 2 |
|---|---|---|
| EPDM | 200 | 200 |
| Thermoplastic Resin | 58.5 | 58.5 |
| Filler | 42 | 42 |
| Wax | 3.2 | 3.2 |
| Zinc Oxide | 2.0 | 2.0 |
| Phenolic Resin | 6.0 | 6.0 |
| SnCl$_2$.2H$_2$O | 2.0 | — |
| Zinc chloride-laurate | — | 1.08 |
| Processing Oil | 30.0 | 30.0 |
| Milliequivalents of Chlorine phr | 17.7 | 1.65 |
| Shore A Hardness | 67 | 69 |
| Ultimate Tensile Strength (psi) | 1044 | 1005 |
| Ultimate Elongation (%) | 351 | 366 |
| M 100 (psi) | 505 | 469 |
| Compression Set, 2 hrs @ 100° C. (%) | 26.7 | 30.6 |
| Weight Gain, 72 hrs. @ 125° C. (%) | 72.4 | 79.8 |
| Tension Set (%) | 8 | 9.6 |
| Aged one week @ 150° C. | | |
| Shore A Hardness | 74 | 76 |
| Ultimate Tensile Strength (psi) | 1011 | 232 |
| Ultimate Elongation (%) | 312 | 1 |
| M 100 (psi) | 556 | 20 |
| Moisture Pick-Up | | |
| Original Dried Sample, % moisture | 0.009 | 0.005 |
| Seven Days, % | 0.731 | 0.063 |
| 14 Days, % | 0.981 | 0.052 |
| 21 Days, % | 0.973 | 0.052 |
| 42 Days, % | 1.262 | 0.072 |

EXAMPLE IV

A fourth experiment was conducted with ingredients that were similar to Examples I & II. Also, it should be noted that in addition to the zinc chloride-laurate catalyst system, zinc laurate having a molecular weight of 463 was added to the mixer in varying amounts.

TABLE IV

| Ingredient | Sample 1 | 2 | 3 | 4 |
|---|---|---|---|---|
| EPDM | 200 | 200 | 200 | 200 |
| Thermoplastic Resin | 58.5 | 58.5 | 58.5 | 58.5 |
| Filler | 42 | 42 | 42 | 42 |
| Zinc chloride-laurate, (MW300) | 0.62 | 0.62 | 0.93 | 0.93 |
| Zn Laurate, MW 463 | 0.72 | 2.16 | — | 1.44 |
| Zinc Oxide | — | — | — | — |
| Phenolic Resin | 6.0 | 6.0 | 6.0 | 6.0 |
| Total | | | | |
| Milliequivalents of Chlorine phr | 2.07 | 2.07 | 3.1 | 3.1 |
| Mequivs. Chlorine/Mequivs. Carboxylate | 0.4 | 0.18 | 1 | 0.33 |
| Shore A Hardness | 75 | 76 | 76 | 79 |
| Ultimate Tensile Strength (psi) | 1435 | 1091.3 | 1425 | 1416.5 |
| Ultimate Elongation | 326 | 244.5 | 333.8 | 342.8 |
| M 100 (psi) | 670.5 | 638 | 669 | 651 |
| Compression Set, 22 hrs @ 110° C. (%) | 22.1 | 23.1 | 25.8 | 28.8 |
| Weight Gain, 72 hrs. @ 125° C. (%) | 79.2 | 80 | 76.6 | 78.9 |
| Tension Set (%) | 9.1 | 10.6 | 8.5 | 9.6 |

| Ingredient | Sample 5 | 6 | 7 |
|---|---|---|---|
| EPDM | 200 | 200 | 200 |
| Thermoplastic Resin | 58.5 | 58.5 | 58.5 |
| Filler | 42 | 42 | 42 |
| Zinc chloride-laurate | 0.93 | 1.23 | 1.23 |
| Zn Laurate, MW 463 | 2.88 | 0.72 | 2.16 |
| Zinc Oxide | — | — | — |
| Phenolic Resin | 1.17 | 1.17 | 1.17 |
| Total | 60.36 | 60.00 | 60.28 |

TABLE IV-continued

| | | | |
|---|---|---|---|
| Milliequivalents of Chlorine phr | 3.1 | 4.14 | 4.14 |
| Mequivs. Chlorine/Mequivs. Carboxylate | 0.2 | 0.57 | 0.31 |
| Shore A Hardness | 76 | 76 | 76 |
| Ultimate Tensile Strength (psi) | 1400.5 | 1440.8 | 1467.8 |
| Ultimate Elongation | 352.3 | 331.3 | 355.5 |
| M 100 (psi) | 615.3 | 656.8 | 618.8 |
| Compression Set, 22 hrs. @ 1100° C. (%) | 27.3 | 30.1 | 28 |
| Weight Gain, 72 hrs. @ 125° C. (%) | 83.6 | 79.5 | 88.4 |
| Tension Set (%) | 11.1 | 10.6 | 11.1 |

EXAMPLE V

A fifth experiment was conducted with ingredients that were similar to the preceding examples except that the EPDM was obtained under the tradename Vistanion™ 3666 (Exxon), which contained about 75 parts by weight processing oil phr, the imidazole-type inhibitor was obtained under the tradename Vanox™ (Vanderbilt), and the hindered-phenolic antioxidant was obtained under the tradename Irganox™ 1010 (Ciba-Giegy). Also, the designation Zinc Oxide I refers to that zinc oxide that was added before vulcanization, and Zinc Oxide II refers to that zinc oxide that was added after vulcanization.

TABLE V

| | Sample | | | | | |
|---|---|---|---|---|---|---|
| Ingredient | 1 | 2 | 3 | 4 | 5 | 6 |
| EPDM | 175 | 175 | 175 | 175 | 175 | 175 |
| Filler | 42 | 42 | 42 | 42 | 42 | 42 |
| Wax | 5 | 5 | 5 | 5 | 5 | 5 |
| Thermoplastic Resin | 58.5 | 58.5 | 58.5 | 58.5 | 58.5 | 58.5 |
| Stannous/zinc chloride-sterate | 1.1 | 1.1 | 1.1 | 1.1 | 1.1 | 1.1 |
| Zinc Oxide I (Before vulcanization) | — | — | — | — | 2 | 2 |
| Phenolic Resin | 5.5 | 5.5 | 5.5 | 5.5 | 5.5 | 5.5 |
| Processing Oil | 55 | 55 | 55 | 55 | 55 | 55 |
| Zinc Oxide II (After vulcanization) | 2 | 4 | 4 | 2 | 2 | — |
| Calcium Sterate | — | — | 1.4 | 1.4 | — | 1.4 |
| Imidazole-type Inhibitor | — | — | 2.8 | 2.8 | — | 2.8 |
| Hindered-Phenolic Antioxidant | — | — | 1.4 | 1.4 | — | 1.4 |
| Milliequivalents of Chlorine phr | 2.68 | 2.68 | 2.68 | 2.68 | 2.68 | 2.68 |
| Shore A Hardness | 70 | 70 | 69 | 70 | 69 | 70 |
| Ultimate Tensile Strength (psi) | 1023 | 1064 | 986 | 881 | 979 | 970 |
| Ultimate Elongation | 343 | 354 | 368 | 334 | 311 | 400 |
| M 100 (psi) | 501 | 498 | 452 | 456 | 519 | 451 |
| Weight Gain 72 hrs. @ 125° C. (%) | 80.5 | 80.2 | 87.5 | 88 | 80.5 | 91.2 |
| Tension Set (%) | 8 | 8 | 8.5 | 8.5 | 8 | 9.2 |
| Heat Ages/5 Days @ 158° C. | | | | | | |
| Shore A Hardness | failure | failure | 70 | 75 | failure | 75 |
| Ultimate Tensile Strength (psi) | — | — | 1340 | 434 | — | 1405 |
| Ultimate Elongation | — | — | 362 | 67 | — | 396 |
| M 100 (psi) | — | — | 714 | — | — | 674 |

EXAMPLE VI

A sixth experiment was conducted with ingredients that were similar to the preceding examples except that the catalyst system of this invention was not employed. Instead, stannous chloride was added and the amount of stannous chloride and phenolic resin were varied.

TABLE VI

| | Sample | | | |
|---|---|---|---|---|
| Ingredient | 1 | 2 | 3 | 4 |
| EPDM | 175 | 175 | 175 | 175 |
| Processing Oil | 30 | 30 | 30 | 30 |
| Filler | 48.5 | 48.5 | 48.5 | 48.5 |
| Thermoplastic Resin | 42 | 42 | 42 | 42 |
| SnCl2 | 1.2 | 1.2 | 0.28 | 0.28 |
| Zinc Oxide | 3.5 | 3.5 | 3.5 | 3.5 |
| Phenolic Resin | 2.5 | 3 | 2.5 | 3 |
| Wax | 5 | 5 | 5 | 5 |
| Milliequivalents of Chlorine phr | 12.7 | 12.7 | 3 | 3 |
| Shore A Hardness | 63 | 63 | 58 | 58 |
| Ultimate Tensile Strength (psi) | 830 | 980 | 580 | 680 |
| M 100 (psi) | 390 | 400 | 290 | 320 |
| Ultimate Elongation | 330 | 370 | 420 | 410 |
| Weight Gain 72 hrs. @ 125° C. (%) | 107 | 104 | 235 | 187 |
| Tension Set (%) | 7 | 7 | 10 | 10 |
| Compression Set, 22 hrs. @ 100° C. (%) | 22 | 19 | 40 | 31 |

While the best mode and preferred embodiments of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A process for forming a thermoplastic vulcanizate comprimising the steps of:
    dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate, where said step of dynamically vulcanizing tales place in the presence of less than seven milliequivalents of halide per 100 grams of rubber.

2. The process of claim 1, where the metal halide is zinc chloride, stannous chloride, or a combination thereof.

3. The process of claim 1, where the metal carboxylate is zinc carboxylate, stannous carboxylate, or a combination thereof.

4. The process of claim 3, where the zinc carboxylate is zinc stearate, zinc benzoate, zinc laurate, zinc hexanoate, zinc naphthenate, zinc neodecanoate, zinc chromate, zinc silicate, zinc carbonate, or a combination thereof.

5. The process of claim 3, where the stannous carboxylate is stannous stearate, stannous benzoate, stannous laurate, stannous hexanoate, stannous naphthenate, stannous neodecanoate, stannous chromate, stannous silicate, stannous carbonate, or a combination thereof.

6. The process of claim 1, where the catalyst system is formed by combining zinc chloride and zinc carboxylate.

7. The process of claim 1, where the catalyst system is formed by combining stannous chloride and stannous carboxylate.

8. The process of claim 1, where the process further comprises adding a hear stabilizer that comprises an imidazole-type inhibitor and a hindered-phenolic antioxidant.

9. The process of claim 8, where the hear stabilizer further comprises calcium stearate.

10. The process of claim 9, where the process further comprises assing zinc oxide.

11. The process of claim 10, where the process further compreses assing a processing oil.

12. The process of claim 9, where said step of adding a stabilizer occurs after said step of dynamically vulcanizing.

13. The process of claim 1, where said step of dynamically vulcanizing takes place in the presence of less than six milliequivalents of halide per 100 grams of rubber.

14. The process of claim 13, where said step of dynamically vulcanizing takes place in the presence of less than fine milliequivalents of halide per 100 grams of rubber.

15. The process of claim 14, where said step of dynamically vulcanizing takes place in the presence of less than four milliequivalents of halide per 100 grams of rubber.

16. The process of claim 15, where said step of dynamically vulcanizing takes place in the presence of less than three milliequivalents of halide per 100 grams of rubber.

17. The process of claim 1, where the phenolic resin is essentially free of halogen substituents or residual halogen compounds.

18. The process of claim 1, where the blend further comprises zinc oxide.

19. A thermoplastic vulcanizate formed by a process comprising the steps of:

dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate, where said step of dynamically vulcanizing takes place in the presence of less than seven milliequivalents of halide per 100 grams of rubber.

20. A thermoplastic vulcanizate comprising:

cured rubber blended with a thermoplastic polymer, where said cured rubber is formed by dynamically curing a rubber by using a phenolic resin curative in the presence of a catalyst system formed by combining a metal halide and a metal carboxylate, where the thermoplastic vulcanizate contains less than seven milliequivalents of halide per 100 grams of rubber, and where said rubber is cured to an extent that less than 15 weight percent of the rubber is extractable from the thermoplastic vulcanizate.

21. A Thermoplastic vulcanizate formed by a process comprising the steps of:

dynamically vulcanizing a rubber within a blend that comprises the rubber, a thermoplastic polymer, and zinc oxide, where said step of vulcanizing is carried out by using a phenolic resin in the presence of a catalyst system formed by combining a metal halide and a metal carboxylate, where said step of dynamically vulcanizing takes place in the presence of less than seven milliequivalents of halide per 100 grams of rubber.

22. The thermoplastic vulcanizate of claim 21, where said zinc oxide is present in an amount from about 1 to about 8 parts by weight per 100 parts by weight rubber.

23. The thermoplastic vulcanizate of claim 22, where said zinc oxide is present in an amount from about 2 to about 6 parts by weight per 100 parts by weight rubber.

24. A thermoplastic vulcanizing formed by a process comprising the steps of:

dynamically vulcanizing a rubber within a blend that comprises the rubber and a thermoplastic polymer, where said step of vulcanizing is carried out by using a phenolic resin in the presence of a catalyst system formed by combining a metal halide and a metal carboxylate; and, adding a stabilizer package that includes an imidazole-type inhibitor, a hindered-phenolic antioxidant, and calcium stearate, where said step of adding occurs after said step of dynamically vulcanizing the rubber is essentially complete.

25. The thermoplastic vulcanizare of claim 24, where said imidazole-type inhibitor is zinc 2-mercaptotoluimidazole, zinc 2-mercaptobenzimidazole, zinc 2-mercapto-4(5)-methylbenzimidazole, or mixtures thereof.

26. The thermoplastic vulcanizate of claim 24, where said hindered phenolic antioxidant is tetrakis[methylene(3,5-di-tert-butyl-4-hydroxyhydrocinnamate)] octadecyl 3,5 -di-t-butyl4,hydroxyhydrocinnamate, the butylated reaction product of p-cresol and dicyclopentadiene, 1,3,5-trimethyl-2,4,6-tris(3,5-di-t-butyl-4-hydroxybenzyl)-benzene, 1,3,5-tris (3,5-di-t-butyl-4-hydroxybenzyl)isocyanurate, or mixtures thereof.

* * * * *